United States Patent
Al-Amin et al.

(10) Patent No.: US 6,425,602 B1
(45) Date of Patent: Jul. 30, 2002

(54) VEHICLE SAFETY SEAT WITH FLUID MANIFOLD

(75) Inventors: Ahmad K. Al-Amin, Higley; Jess A. Cuevas, Scottsdale; Bryan W. Shirk, Mesa; Timothy A. Swann, Mesa; Roy D. Van Wynsberghe, Mesa; Eric C. Erike, Mesa; Kevin M. Brown, Mesa; Vincent J. Mramor, Chandler, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/526,393

(22) Filed: Mar. 16, 2000

(51) Int. Cl.$^7$ .............................................. B60R 21/22
(52) U.S. Cl. .............................. 280/730.2; 280/730.1; 280/806
(58) Field of Search .............................. 280/730.1, 735, 280/730.2, 806

(56) References Cited

U.S. PATENT DOCUMENTS

| | | | |
|---|---|---|---|
| 3,642,303 A | * 2/1972 | Irish et al. ............. | 280/150 AB |
| 5,505,485 A | * 4/1996 | Breed ...................... | 280/729 |
| 5,615,909 A | 4/1997 | Wipasuramonton et al. | |
| 5,670,853 A | * 9/1997 | Bauer ...................... | 318/286 |
| 5,704,638 A | * 1/1998 | Lane ....................... | 280/730.2 |
| 5,779,263 A | * 7/1998 | Lane, Jr. et al. ......... | 280/730.2 |
| 5,863,009 A | 1/1999 | Bauer et al. | |
| 5,913,536 A | * 6/1999 | Brown ..................... | 280/730.2 |
| 6,158,812 A | * 12/2000 | Bonke ....................... | 297/391 |

\* cited by examiner

Primary Examiner—Kenneth R. Rice
Assistant Examiner—Christopher Buchanan
(74) Attorney, Agent, or Firm—Tarolli, Sundheim, Covell, Tummino & Szabo L.L.P.

(57) ABSTRACT

An apparatus includes a vehicle seat (10) having a tubular seat frame (60) defining a fluid manifold (66). The apparatus also includes at least two deployable vehicle occupant protection devices (120, 130, 140, 142) for helping to protect a vehicle seat occupant from injury in the event of a vehicle collision. The protection devices (120, 130, 140, 142) are spaced apart from each other. The protection devices (120, 130, 140, 142) are in fluid communication with the fluid manifold (66) and are deployable by fluid directed into the protection devices from the fluid manifold. A single actuatable device (150) provides pressurized fluid for deploying one or more of the protection devices (120, 130, 140, 142). The actuatable device (150) is in fluid communication with the fluid manifold (66).

31 Claims, 3 Drawing Sheets

VEHICLE SAFETY SEAT WITH FLUID MANIFOLD

TECHNICAL FIELD

The present invention relates to a vehicle seat, and is particularly directed to a vehicle safety seat for helping to protect a vehicle seat occupant from injury in the event of a vehicle collision.

BACKGROUND OF THE INVENTION

A typical vehicle seat includes a seat cushion and a seat back which projects upward from the seat cushion. The seat cushion and the seat back include padding and a covering, such as cloth or leather, which are supported by metal framework inside the vehicle seat. The framework can also be used to mount vehicle occupant protection devices.

Various protection devices are known for helping to protect an occupant of a vehicle seat from injury in the event of a vehicle collision. Known protection devices include front impact air bags, seat belt webbing pretensioners, inflatable knee bolsters, side impact air bags and side curtains, and rear impact or whiplash protection air bags that inflate to support the head of the vehicle seat occupant. Each of these known protection devices is deployed or inflated using pressurized fluid from an actuatable device, such as an inflator. Typically, each of the aforementioned protection devices has a separate inflator, although it is known to use a single inflator with more than one protection device.

SUMMARY OF THE INVENTION

The present invention is an apparatus comprising a vehicle seat having a tubular seat frame defining a fluid manifold. The apparatus also comprises at least two deployable vehicle occupant protection devices for helping to protect a vehicle seat occupant from injury in the event of a vehicle collision. The at least two protection devices are spaced apart from each other. The at least two protection devices are in fluid communication with the fluid manifold and are deployable by fluid directed into the at least two protection devices from the fluid manifold. A single actuatable device provides pressurized fluid for deploying one or more of the at least two protection devices. The actuatable device is in fluid communication with the fluid manifold.

In accordance with a feature of the present invention, the apparatus further comprises at least one controllable valve disposed within the fluid manifold for selectively permitting the flow of fluid from the actuatable device to one or more of the at least two protection devices.

In accordance with another feature of the present invention, the at least two protection devices include a seat belt webbing pretensioner located adjacent the vehicle seat.

In accordance with yet another feature of the present invention, the at least two protection devices include a side impact air bag mounted in the vehicle seat.

In accordance with still another feature of the present invention, the at least two protection devices include at least one whiplash protection air bag mounted atop the vehicle seat.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
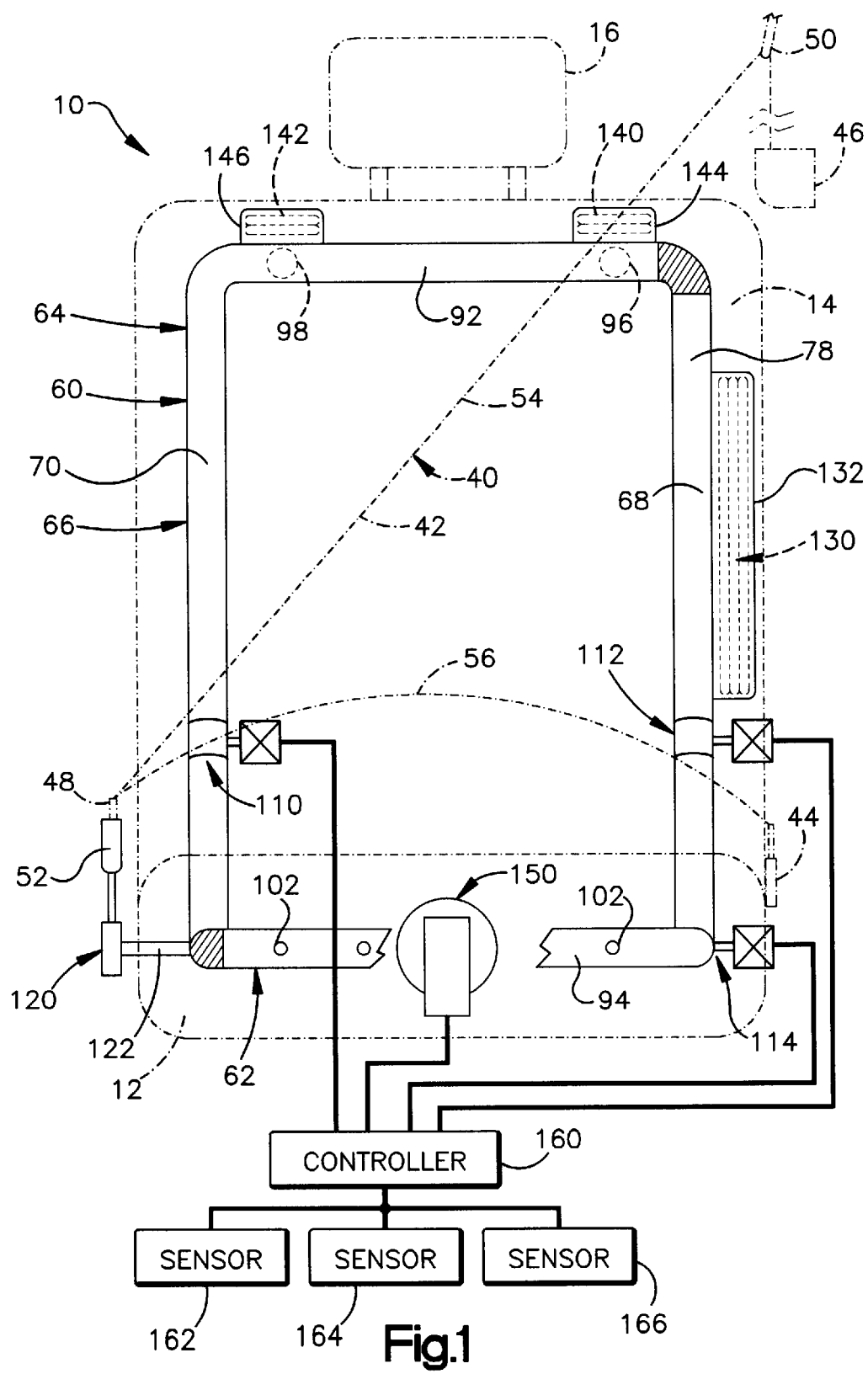
FIG. 1 is a schematic plan view of a vehicle seat illustrating occupant protection devices associated with the vehicle seat.

The present invention relates to a vehicle seat, and is particularly directed to a vehicle safety seat for helping to protect a vehicle seat occupant from injury in the event of a vehicle collision. As representative of the present invention, FIG. 1 schematically illustrates a vehicle seat 10.

The vehicle seat 10 has a seat cushion 12, a seat back 14, and a head rest 16. The seat cushion 12 includes padding (not shown) and an outer cover 18 (FIG. 3), such as cloth or leather, which covers the padding. The seat cushion 12 has oppositely disposed first and second side edges 20 and 22, a front edge 24, a rear edge 26, and an upper surface 28 upon which a vehicle occupant sits. The seat back 14 has oppositely disposed first and second side edges 30 and 32, a front surface 34 against which the torso of a vehicle occupant rests, and an upper edge 36 from which the head rest 16 telescopically projects.

A three-point continuous loop seat belt system 40 (FIG. 1) is provided for helping to restrain an occupant of the vehicle seat 10. The seat belt system 40 includes a length of seat belt webbing 42 extensible about the vehicle occupant. One end of the length of seat belt webbing 42 is anchored to the vehicle body at an anchor point 44, while the opposite end of the seat belt webbing is attached to a seat belt webbing retractor 46. Intermediate its ends, the seat belt webbing 42 passes through a tongue assembly 48 and a D-ring 50 located above the retractor 46. The tongue assembly 48 is connectable with a buckle 52, which is secured to the vehicle body in a manner not shown. When the tongue assembly 48 is connected with the buckle 52 as shown in FIG. 1, the length of seat belt webbing 42 is divided into a torso portion 54, which extends across the torso of the occupant, and a lap portion 56, which extends across the lap of the occupant.

The vehicle seat 10 includes a tubular seat frame 60, which supports the seat cushion 12 and the seat back 14. The seat frame 60 is secured to the vehicle floor in a manner not shown. A first portion 62 of the seat frame 60 is located within the seat cushion 12 and a second portion 64 of the seat frame is located within the seat back 14. The first and second portions 62 and 64 of the tubular seat frame 60 define a fluid manifold 66 extending inside the seat cushion 12 and the seat back 14 of the vehicle seat 10.

Figure 2:
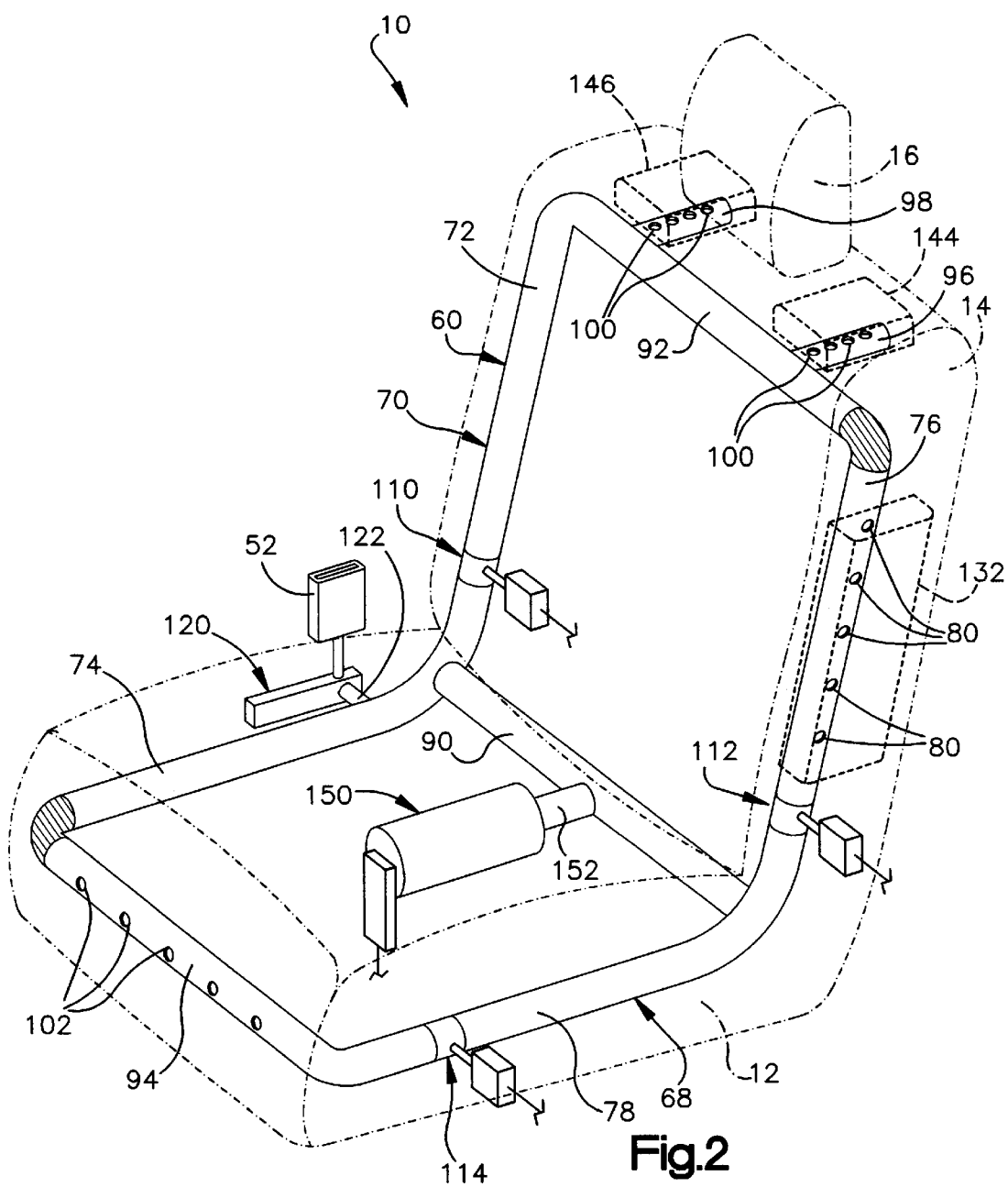
FIG. 2 is a schematic perspective view of the vehicle seat of FIG. 1 with parts omitted for clarity.

The seat frame 60 includes first and second L-shaped manifold members 68 and 70 (FIG. 2). The second manifold member 70 is defined by upper and lower legs 72 and 74. The lower leg 74 of the second manifold member 70 extends along the second side edge 22 of the seat cushion, while the upper leg 72 of the second manifold member extends along the second side edge 32 of the seat back 14. Similarly, the first manifold member 68 is defined by upper and lower legs 76 and 78. The lower leg 78 of the first manifold member 68 extends along the first side edge 20 of the seat cushion 12, while the upper leg 76 of the first manifold member extends along the first side edge 30 of the seat back 14. The upper leg 76 of the first manifold member 68 includes an array of fluid outlet openings 80.

The seat frame 60 further includes a connecting manifold member 90, an upper manifold branch 92, and a lower manifold branch 94. The connecting manifold member 90 extends transversely along the rear edge 26 of the seat cushion 12 and provides fluid communication between the lower legs 78 and 74 of the first and second manifold members 68 and 70, respectively. The upper manifold branch 92 extends transversely along the upper edge 36 of the seat back 14. The upper manifold branch 92 is connected to the upper legs 76 and 72 of both the first and second manifold members 68 and 70, respectively, but is in fluid communication with only the second manifold member 70. The junction of the upper manifold branch 92 and the upper leg 76 of the first manifold member 68 is blocked off to prevent fluid flow between the upper manifold branch and the upper leg of the first manifold member.

The upper manifold branch 92 includes first and second diffuser portions 96 and 98 disposed on either side of the head rest 16 on the seat back 14. The diffuser portions 96 and 98 project away from the front surface 34 of the seat back 14. Each of the first and second diffuser portions 96 and 98 has a plurality of fluid exit openings 100.

The lower manifold branch 94 extends transversely along the front edge 24 of the seat cushion 12. The lower manifold branch 94 is attached to the lower legs 78 and 74 of both the first and second manifold members 68 and 70, respectively, but is in fluid communication with only the first manifold member 68. The junction of the lower manifold branch 94 and the lower leg 74 of the second manifold member 70 is blocked off to prevent fluid flow between the lower manifold branch and the lower leg of the second manifold member. The lower manifold branch 94 includes a plurality of fluid vent openings 102.

The vehicle seat 10 includes three electrically controllable valves located in the tubular seat frame 60. A first valve 110 is positioned within the upper leg 72 of the second manifold member 70. The first valve 110 is operable to prevent or permit a controlled fluid flow through the upper leg 72 of the second manifold member 70 and into the upper manifold branch 92. A second valve 112 is positioned within the upper leg 76 of the first manifold member 68. The second valve 112 is operable to prevent or permit a controlled fluid flow into the upper leg 76 of the first manifold member 68. A third valve 114 is positioned within the lower leg 78 of the first manifold member 68. The third valve 114 is operable to prevent or permit a controlled fluid flow through the lower leg 78 of the first manifold member 68 and into the lower manifold branch 94.

The vehicle seat 10 further includes a plurality of vehicle occupant protection devices for helping to protect an occupant of the vehicle seat from injury in the event of a vehicle collision. Each of the plurality of protection devices is in fluid communication with the fluid manifold 66 defined by the tubular seat frame 60 and is deployable by pressurized fluid. The plurality of protection devices includes a seat belt webbing pretensioner 120, an inflatable side impact air bag 130 (FIG. 3), and inflatable first and second rear impact (or whiplash protection) air bags 140 and 142.

The seat belt webbing pretensioner 120 is of known construction and is located adjacent the second side edge 22 of the seat cushion 12. A fluid conduit 122 connects the pretensioner 120 with the lower leg 74 of the second manifold member 70. As is known in the art, when fluid under pressure is applied to the pretensioner 120, a piston (not shown) inside the pretensioner moves in the direction of arrow A in FIG. 3. Movement of the piston causes the buckle 52 and the tongue assembly 48, which are attached to the piston, to move downward in the direction of arrow B in FIG. 3. This downward movement of the buckle 52 pulls out slack in the length of seat belt webbing 42 so that the seat belt webbing can better restrain the occupant of the vehicle seat 10.

Figure 3:
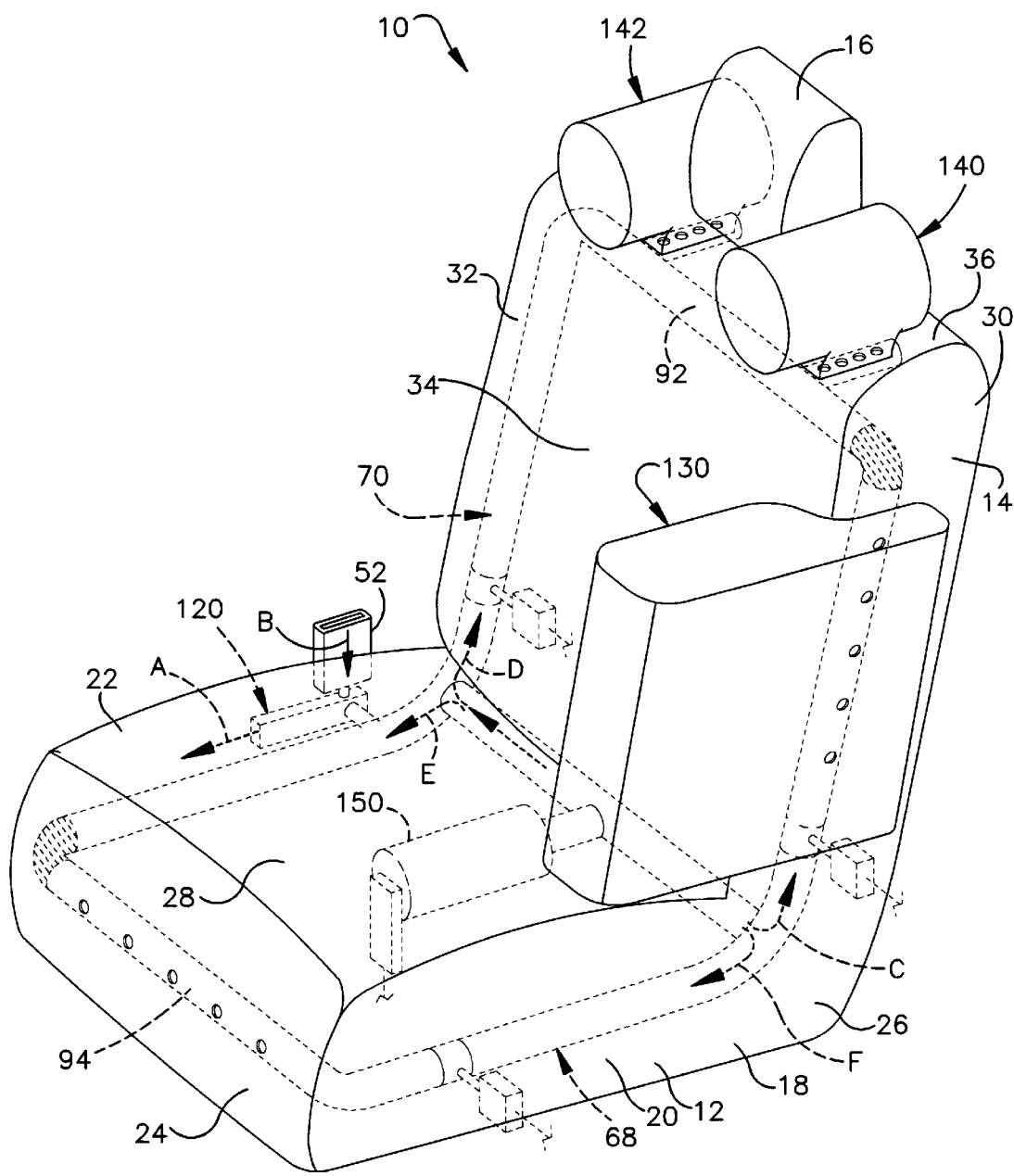
FIG. 3 is a schematic perspective view similar to FIG. 2 illustrating the occupant protection devices in a deployed condition.

The side impact air bag 130 is of known construction and is stowed within a housing 132 (FIG. 1) secured to the upper leg 76 of the first manifold member 68 inside the seat back 14. The housing 132 is secured over the array of fluid outlet openings 80 in the upper leg 76 of the first manifold member 68 so that pressurized fluid in the upper leg is directed into the side impact air bag 130 through the array of fluid outlet openings. The side impact air bag 130, when inflated by pressurized fluid, emerges from the housing 132 in the seat back 14 through a predefined tear seam (not shown) in the outer cover 18 of the seat back. The fully inflated side impact air bag 130 extends toward the front of the vehicle seat 10 and lies parallel to the first side edge 20 of the seat cushion 12, as is shown in FIG. 3.

The first and second rear impact air bags 140 and 142 are of known construction and are stowed within first and second housings 144 and 146 (FIG. 1), respectively, in the seat back 14. The first housing 144 is secured to the first diffuser portion 96 and extends over the plurality of fluid exit openings 100 in the first diffuser portion. Pressurized fluid in the upper manifold branch 92 is directed into the first rear impact air bag 140 through the fluid exit openings 100. Similarly, the second housing 146 is secured to the second diffuser portion 98 and extends over the plurality of fluid exit openings 100 in the second diffuser portion. Pressurized fluid in the upper manifold branch 92 is directed into the second rear impact air bag 142 through the fluid exit openings 100. The rear impact air bags 140 and 142, when inflated by pressurized fluid in the upper manifold branch 92, emerge from the upper edge 36 of the seat back 14 through predefined tear seams (not shown) in the outer cover 18 of the seat back. The fully inflated rear impact air bags 140 and 142 project upward alongside the head rest 16 and also extend toward the front of the vehicle seat 10, as is shown in FIG. 3.

The vehicle seat 10 further includes a single actuatable inflator 150 for providing pressurized fluid to one or more of the aforementioned protection devices. In accordance with a preferred embodiment of the invention, the inflator 150 comprises a cold stored gas inflator known in the art. The inflator 150 is mounted in the seat cushion 12 and is in fluid communication with the connecting manifold member 90 of the seat frame through a supply conduit 152 (FIG. 2).

The inflator 150 and the valves 110, 112 and 114 in the seat frame 60 are electrically connected to a controller 160 (FIG. 1). The controller 160 is also electrically connected with a plurality of sensors in the vehicle, such a side impact collision sensor 162, a frontal impact sensor 164, and a rear impact sensor 166. The controller 160 is operable to receive electrical signals from the sensors 162, 164 and 166 and to actuate the inflator 150 based on the electrical signals received from the sensors. Further, the controller 160 is operable to open or close each of the valves 110, 112 and 114 based on the electrical signals received from the sensors 162, 164 and 166.

For example, in the event that a side impact collision is detected by the side impact sensor 162, an electrical signal indicative of the side impact collision is sent to the controller 160 by the side impact sensor. The controller 160 provides electrical signals which cause the first and second valves 110 and 112 to be opened and the third valve 114 to be shut. The controller 160 also provides a signal that causes the inflator 150 to actuate and begin releasing stored pressurized gas through the supply conduit 152 and into the connecting manifold member 90. The pressurized gas flows through the connecting manifold member 90 and into the first and second manifold members 68 and 70.

With the second valve 112 open, the gas in the first manifold member 68 flows into the upper leg 76 in the direction of arrow C in FIG. 3. The gas is then directed into the side impact air bag 130 through the gas outlet openings 80, causing the side impact air bag to inflate. The inflating side impact air bag 130 deploys out of the first side edge 30 of the seat back 14 and into the position shown in FIG. 3 to help prevent injury to the torso of the occupant of the vehicle seat 10. Because the third valve 114 is closed, the flow of gas through the lower leg 78 of the first manifold member 68 and into the lower manifold branch 94 is prevented.

Since the first valve 110 is open, the pressurized gas also flows into the upper leg 72 of the second manifold member 70 in the direction of arrow D in FIG. 3. The gas then flows into the upper manifold branch 92 and is directed through the gas exit openings 100 in the diffuser portions 96 and 98 into the rear impact air bags 140 and 142, causing the rear impact air bags to inflate. The inflating rear impact air bags 140 and 142 deploy out of the upper edge 36 of the seat back 14 and into the respective positions shown in FIG. 3 to help prevent injury to the head and neck of the occupant of the vehicle seat 10.

Gas from the connecting manifold member 90 also flows into the lower leg 74 of the second manifold member 70, in the direction of arrow E, and is directed into the pretensioner 120 through the fluid conduit 122. The pressurized gas moves the piston (not shown) in the pretensioner 120, which, in turn, causes the buckle 52 to move downward in the direction of arrow B and the seat belt webbing 42 to be tightened against the occupant of the vehicle seat 10. Thus, in a side impact collision, the pretensioner 120, the side impact air bag 130, and the rear impact air bags 140 and 142 are all deployed by pressurized fluid from the single inflator 150.

If, instead, a rear impact collision is detected by the rear impact sensor 166, an electrical signal indicative of the rear impact collision is sent to the controller 160. The controller 160 provides electrical signals causing the first and third valves 110 and 114 to be opened and the second valve 112 to be shut. The controller 160 also provides a signal that causes the inflator 150 to actuate and begin releasing stored pressurized gas into the connecting manifold member 90. The pressurized gas flows through the connecting manifold member 90 and into the first and second manifold members 68 and 70.

Since the first valve 110 is open, the pressurized gas flows into the upper leg 72 of the second manifold member 70 in the direction of arrow D. The gas then flows into the upper manifold branch 92 and into the rear impact air bags 140 and 142, causing the rear impact air bags to inflate.

Gas from the connecting manifold member 90 also flows into the lower leg 74 of the second manifold member 70, in the direction of arrow E, and is directed into the pretensioner 120 through the fluid conduit 122. The pressurized gas moves the piston (not shown) in the pretensioner 120, which, in turn, causes the buckle 52 to move downward in the direction of arrow B and the seat belt webbing 42 to be tightened against the occupant of the vehicle seat 10.

With the second valve 112 closed, the gas does not flow into the upper leg 76 of the first manifold member 68. Hence, the side impact air bag 130 is not deployed. However, because the third valve 114 is open, the gas does flow through the lower leg 78 of the first manifold member 68, in the direction of arrow F, and into the lower manifold branch 94 so that excess gas from the inflator 150 is vented through the vent openings 102. Thus, in a rear impact collision, only the pretensioner 120 and the rear impact air bags 140 and 142 are deployed by pressurized fluid from the inflator 150.

If, however, a frontal impact collision is detected by the frontal impact sensor 164, an electrical signal indicative of the frontal impact collision is sent to the controller 160. The controller 160 provides electrical signals causing the first and second valves 110 and 112 to be shut and the third valve 114 to be opened. The controller 160 also provides a signal that causes the inflator 150 to actuate and begin releasing stored pressurized gas into the connecting manifold member 90. The pressurized gas flows through the connecting manifold member 90 and into the first and second manifold members 68 and 70.

Gas from the connecting manifold member 90 flows into the lower leg 74 of the second manifold member 70, in the direction of arrow E, and is directed into the pretensioner 120 through the fluid conduit 122. The pressurized gas moves the piston (not shown) in the pretensioner 120, which, in turn, causes the buckle 52 to move downward in the direction of arrow B and the seat belt webbing 42 to be tightened against the occupant of the vehicle seat 10.

Since the first valve 110 is shut, the pressurized gas does not flow into the upper leg 72 of the second manifold member 70. Hence, the rear impact air bags 140 and 142 are not deployed. Further, since the second valve 112 is also closed, the gas does not flow into the upper leg 76 of the first manifold member 68 and the side impact air bag 130 is not deployed. Because the third valve 114 is open, however, the gas flows through the lower leg 78 of the first manifold member 68, in the direction of arrow F, and into the lower manifold branch 92 where excess gas from the inflator 150 is vented through the vent openings 102. Thus, in a frontal impact collision, only the pretensioner 120 is deployed by pressurized fluid from the inflator 150.

From the above description of the invention, those skilled in the art will perceive improvements, changes and modifications. For example, it is contemplated that the valves could be used to control the amount of gas that flows into one or more of the air bags to tailor the slope of the inflation curves of the air bags based on predetermined specifications or sensed occupant characteristics. It is also contemplated that a single sensor could be used to perform the functions of the three sensors 162, 164 and 166. Such improvements, changes and modifications within the skill of the art are intended to be covered by the appended claims.

Having described the invention, we claim:

1. An apparatus comprising:

a vehicle seat having a tubular seat frame defining a fluid manifold;

at least two deployable vehicle occupant protection devices for helping to protect a vehicle seat occupant from injury in the event of a vehicle collision, said at least two protection devices being spaced apart from each other, said at least two protection devices being in fluid communication with said fluid manifold defined by said tubular seat frame and being deployable by fluid directed into said at least two protection devices from said fluid manifold defined by said tubular seat frame; and a single actuatable device for providing pressurized fluid for deploying one or more of said at least two protection devices, said actuatable device being in fluid communication with said fluid manifold defined by said tubular seat frame, said actuatable device further being disposed at a location spaced apart from said at least two deployable vehicle occupant protection devices, each one of said at least two deployable occupant protection devices being associated with a respective diffuser portion of said fluid manifold defined by said tubular seat frame, said diffuser portions being spaced apart from each other along said tubular seat frame, said fluid manifold defined by said tubular seat frame comprising a fluid conduit for directing the pressurized fluid from said actuatable device to said at least two deployable vehicle occupant protection devices, said fluid manifold defined by said tubular seat frame further comprising a valve disposed in said fluid conduit for blocking flow of said pressurized fluid to one of said at least two deployable occupant protection devices to prevent deployment of said one of said at least two deployable occupant protection devices when said actuatable device is actuated.

2. The apparatus of claim 1 further comprising another valve disposed within said fluid manifold defined by said tubular seat frame for selectively permitting the flow of fluid from said actuatable device to another of said at least two protection devices.

3. The apparatus of claim 2 further comprising a controller and at least one collision sensor electrically connected with said controller to provide an electrical signal indicative of a vehicle collision to said controller, said controller being operatively coupled with said actuatable device and with said valves.

4. The apparatus of claim 2 wherein said fluid manifold defining a tubular seat frame includes at least one vent opening for venting a portion of the pressurized fluid from said actuatable device when one of said valves blocks the flow of fluid to one or more of said at least two protection devices.

5. The apparatus of claim 1 wherein said at least two protection devices include a seat belt webbing pretensioner located adjacent said vehicle seat.

6. The apparatus of claim 1 wherein said at least two protection devices include a side impact air bag mounted in said vehicle seat.

7. The apparatus of claim 1 wherein said at least two protection devices include at least one whiplash protection air bag mounted in said vehicle seat.

8. The apparatus of claim 7 wherein said at least two protection devices include a pair of whiplash protection air bags mounted in said vehicle seat.

9. The apparatus of claim 7 wherein said valve is disposed within said fluid manifold defined by said tubular seat frame for selectively permitting the flow of fluid from said actuatable device to said at least one whiplash protection air bag.

10. The apparatus of claim 9 wherein said at least two protection devices include a side impact air bag mounted in said vehicle seat.

11. The apparatus of claim 10 further comprising another valve disposed within said fluid manifold defined by said tubular seat frame for selectively permitting the flow of fluid from said actuatable device to said side impact air bag.

12. The apparatus of claim 11 wherein said at least two protection devices include a seat belt webbing pretensioner located adjacent said vehicle seat.

13. The apparatus of claim 12 wherein said fluid manifold includes at least one vent opening for venting a portion of the pressurized fluid from said actuatable device.

14. The apparatus of claim 13 further comprising a third valve disposed within said fluid manifold defined by said tubular seat frame for selectively permitting the flow of fluid from said actuatable device to said at least one vent opening when one or both of said other valves block the flow of fluid in said fluid manifold defined by said tubular seat frame.

15. The apparatus of claim 1 wherein said single actuatable device comprises a stored gas inflator for providing gas under pressure.

16. An apparatus comprising:

a vehicle seat having a seat cushion, a seat back, and a tubular seat frame;

said seat frame defining a fluid manifold and including at least one L-shaped manifold member, said manifold member being located within said seat cushion and said seat back of said vehicle seat, said L-shaped manifold member having a first branch extending along said seat cushion, a second branch extending along said seat back, and a connecting member in fluid communication with both said first and second branches;

at least one deployable vehicle occupant protection device for helping to protect a vehicle seat occupant from injury in the event of a vehicle collision, one of said at least one protection device being in fluid communication with said first branch and being deployable by fluid directed into said connecting member; and an actuatable device for providing pressurized fluid for deploying said at least one protection device, said actuatable device being spaced from said at least one protection device and being in fluid communication with said connecting member, said actuatable device further being disposed at a location spaced apart from said at least two deployable vehicle occupant protection devices, said fluid manifold defined by said tubular seat frame comprising a fluid conduit for directing the pressurized fluid from said actuatable device, through said connecting member, to said at least two deployable vehicle occupant protection devices, said fluid manifold defined by said tubular seat frame further comprising a valve disposed in said fluid conduit for blocking flow of said pressurized fluid to one of said at least two deployable occupant protection devices to prevent deployment of said one of said at least two deployable occupant protection devices when said actuatable device is actuated.

17. The apparatus of claim 16 wherein said seat frame includes first and second L-shaped manifold members and said connecting member extends between said first and second L-shaped manifold members to provide fluid communication between said first and second L-shaped manifold members.

18. The apparatus of claim 17 wherein said actuatable device is attached to said connecting member to provide fluid into said connecting member.

19. The apparatus of claim 18 wherein said at least one protection device comprises at least one whiplash protection air bag mounted in said seat back.

20. The apparatus of claim 19 wherein said valve is disposed within said first L-shaped manifold member for selectively permitting the flow of fluid from said actuatable device to said at least one whiplash protection air bag.

21. The apparatus of claim 20 wherein said at least one protection device includes a side impact air bag mounted in said seat back.

22. The apparatus of claim 21 further comprising another valve disposed within said second L-shaped manifold member for selectively permitting the flow of fluid from said actuatable device to said side impact air bag.

23. The apparatus of claim 22 wherein said at least one protection device further includes a seat belt webbing pretensioner located adjacent said seat cushion.

24. The apparatus of claim 23 wherein said seat frame includes at least one vent opening for venting a portion of the pressurized fluid from said actuatable device.

25. The apparatus of claim 24 further comprising a third valve disposed within said seat frame for selectively permitting the flow of fluid from said actuatable device to said at least one vent opening when one or both of said other valves block the flow of fluid in said seat frame.

26. The apparatus of claim 16 wherein said single actuatable device comprises a stored gas inflator for providing gas under pressure.

27. The apparatus of claim 16 wherein said valve is disposed within said seat frame for selectively permitting the flow of fluid from said actuatable device to said at least one protection device.

28. The apparatus of claim 27 further comprising a controller and at least one collision sensor electrically connected with said controller to provide an electrical signal indicative of a vehicle collision to said controller, said controller being operatively coupled with said actuatable device and with said valve.

29. The apparatus of claim 16 wherein said at least one protection device comprises a seat belt webbing pretensioner located adjacent said seat cushion.

30. The apparatus of claim 16 wherein said at least one protection device comprises a side impact air bag mounted in said seat back.

31. The apparatus of claim 16 wherein said at least one protection device comprises at least one whiplash protection air bag mounted in said seat back.

* * * * *